Sept. 8, 1970        W. H. NOLAN ET AL        3,527,325
SLACK ADJUSTOR
Filed June 24, 1968

INVENTOR.
WILLIAM H. NOLAN
HAROLD F. STOVER
BY *Newton, Hopkins,*
*& Ormsby*
*Attorneys*

United States Patent Office 3,527,325
Patented Sept. 8, 1970

3,527,325
SLACK ADJUSTOR
William H. Nolan, 2631 Main St., and Harold F. Stover, 1731 Forrest Ave., both of East Point, Ga. 30044
Filed June 24, 1968, Ser. No. 739,299
Int. Cl. F16d 65/44
U.S. Cl. 188—197    8 Claims

ABSTRACT OF THE DISCLOSURE

A slack adjusting or compensating device and method of operation comprising a tubular housing, a movable, hollow cylinder slidably positioned in said housing, a plurality of openings or apertures in said housing and said cylinder in alignment with each other and a locking pin in said openings.

---

This invention is concerned with a mechanism for taking up slack which occurs due to the wearing out of material. More particularly, this invention is concerned with a slack adjusting or compensating device, said slack arising due to the wearing out of a brake shoe on a locomotive brake mechanism.

Due to the economics of the present day railroad, it has become most important to be as economical as possible in maintenance and repairs of the locomotives and cars of the several railroad corporations. The conventional brake shoe of a locomotive was developed in the early 1900's. Since then, very little advancement has been made over the original concept of the brake shoe. It has been conventional in the prior art when a brake shoe has worn down to the point where it may not be used any further, to remove the entire brake shoe assembly and replace it with a new assembly. This is of course expensive in a material sense and also expensive in the time consumed in removing the entire assembly and replacing it with a new one. There are a number of devices in the prior art which have as their object to adjust for the wearing of the brake shoe. These slack adjustor devices usually freeze within a short period of time after their installation. Due to weather conditions, debris from the railroad track itself, and other reasons, these slack adjusting devices rust or corrode so that the entire slack adjustment device must be replaced or removed when the brake shoe itself has worn to the point where it may not be safely used in the future. This of course is expensive and time consuming. The movable parts of these prior art devices solidify and are no longer able to move in order to take up the slack.

It is therefore the primary object of this invention to provide an economical apparatus for adjusting or compensating for the wearing of a brake shoe.

Another object of this invention is to provide a mechanism for adjusting the brake mechanism of a railroad wheel so that only a part of it need be replaced when the brake shoe has completely worn out.

A further object of this invention is to provide an adjustable slack compensating device with a simplicity of design and readily assembled and disassembled.

These and other objects of this invention will become apparent from an examination of the following description and drawings, wherein like reference numerals indicate alike parts in the several figures where they appear.

Figure 1:
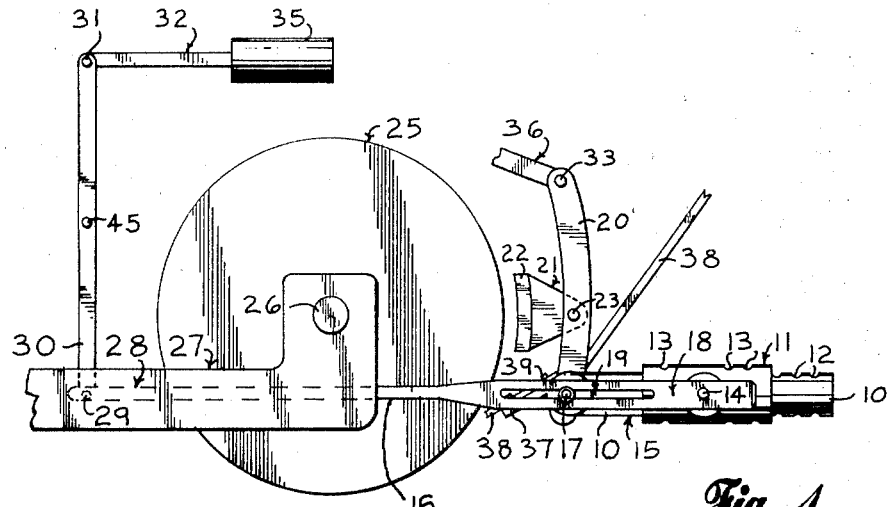
FIG. 1 is a side elevation view of a portion of a railroad car truck illustrating the slack compensating device of this invention.
Figure 2:
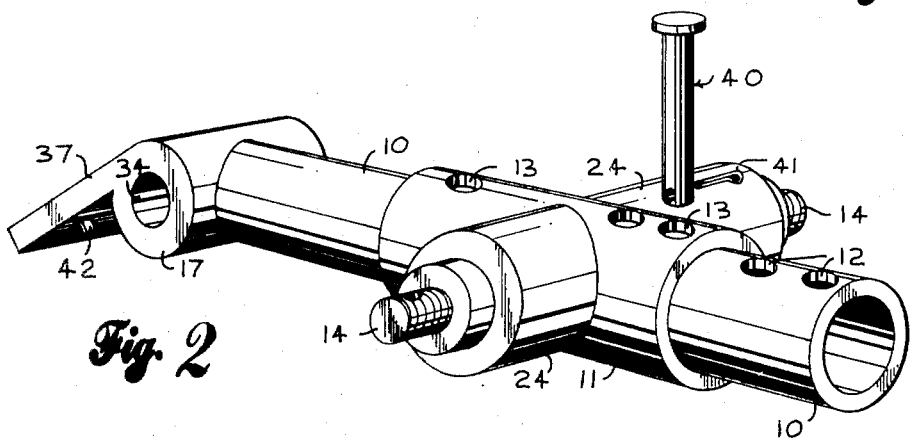
FIG. 2 is a perspective view of the slack compensating device alone.
Figure 3:
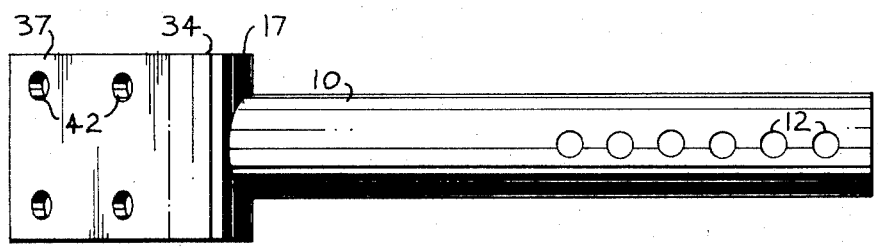
FIG. 3 is an enlarged view of the movable portion of the slack compensating device.
Figure 4:
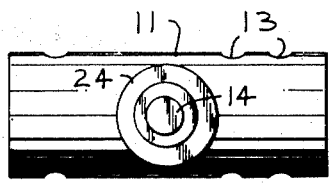
FIG. 4 is an enlarged view of the stationary tubular housing part of the slack adjusting device.

Referring now to the drawings for a better understanding of the invention and particularly to FIG. 1 of the drawings, it will be seen that the device is shown as applied to the brake assembly of a conventional railroad car truck. Frame 27 supported on a pair of spaced wheel and axle assemblies 25 and 26, only one of which is shown. Wheel 25 is supported by axle 26 which in turn is supported by frame 27. Brake rod 16, passing between the frame 27 and wheel 25, is supported at its forward end 28 by rod 30 which is pivotally connected to the brake rod at 29. Rod 30 is pivotally mounted at 45 and connected to rod 32 at 31. Rod 32 is activated by air cylinder 35 which is attached to the underframe of the locomotive, not shown. While only one brake rod 16 is shown in FIG. 1, there are in reality two brake rods 16 working on each wheel 25. At the other end 18 of brake rod 16, it becomes enlarged in width and has horizontal slot 19 pierced therethrough.

This enlarged end 18 of brake rods 16, supports between the two of them the slack compensating device of this invention. Stationary tubular housing 11 of the compensating device is attached between the two brake rods at 14 where same is bolted to the brake rods. Thus, housing 11 is permanently fixed and is not movable. It is a hollow cylinder with support flanges 24 extending at right angles thereto. Within this circular support housing 11 is inserted a circular elongated cylinder which is hollow. At the outward extended end of movable hollow cylinder 10 are apertures or openings 12; there may be as many as four to six of these openings. In stationary housing 11 through which cylinder 10 passes, there are openings or apertures 13 which are aligned with openings 12 in movable cylinder 10. These openings or apertures 12 and 13 are present on both the front and back sides of these circular housings and cylinders. Stationary housing 11 extends only a short distance inwardly from point or bolt 14. The inner end of cylinder 10 has attached thereto a small cylinder 17 at right angles. It is at this point that brake shoe lever 20 is pivotally attached by inserting a bolt through opening 34 of small cylinder 17. This cylinder 17 fits snugly between the two brake rods 16. Attached to small cylinder 17 is metal plate 37 which is at a slight angle to the movable hollow cylinder 10. This is used to support conduit 38 which permits sand to be used in the braking action of this wheel. Sand conduit 38 is attached to plate 37 by two U bolts 39 at 42.

Brake shoe lever 20 is attached at its other end to support arm 36 which pivots around point 33. Support rod 36 is attached to the underframe of the locomotive, not shown. Attached to the middle section of curved brake shoe lever 20 at point 23 is brake shoe holder 21 which has attached on its outer face brake shoe 22. This connection at 23 is a pivotal connection.

Once brake shoe 22 is worn to the point where it no longer operates efficiently and safely, cylinder 10 is urged forward and held in a new position by bolt 40 which is inserted through opening 13 in stationary housing 11, said openings 13 are in alignment with a specific opening 12 in movable cylinder 10. Thus, bolt 40 with its key 41 inserted therethrough, holds cylinder 10 in its new position which corrects for the wearing down of brake shoe liner 22.

Thus, with the mechanism of this invention, once the brake shoe has worn to the point of being inefficient and unsafe, the mechanism of this invention is activated and the change in distance or width of shoe 22 is adjusted for by cylinder 10 and housing 11 through which cylinder 10 passes in a direct line. By using a hollow cylinder 10 instead of a solid cylinder, water and foreign matter which may splash from the railroad bed onto this mechanism, is prevented from being retained in and around this mechanism and causing same to freeze by rusting, etc. With the hollow cylinder 10, and openings 12 and 13, any water which splashes upward will drain therefrom in due course. In addition, once brake shoe 22 has worn to the point it cannot be compensated for by any device, it is necessary only to loosen bolt 40 by removing key 41 and removing connection 17 which is slidably mounted in slot 19, from the brake shoe lever, disconnecting sand pipe or conduit 38 from plate 37, and one swiftly removes cylinder 10 from the entire braking assembly with a minimum of time and effort. The use of plate 37 to support sand conduit 38 is optional, and it may be omitted. When a new brake shoe 22 and brake shoe support 21, are attached to brake lever 20, a new cylinder 10 may be swiftly inserted into stationary housing 11 and connected onto the brake shoe lever 20 with a minimum of time and effort. Instead of having to remove the entire slack compensating device, and installing a new one, only the movable section or conduit 10 of the slack compensating device of this invention need be replaced, if at all. It is possible that this mechanism or cylinder 10 will be in good condition even though brake shoe 22 has worn out completely and thus the new brake shoe 22 may be installed without replacing cylinder 10.

It is obvious to those skilled in the art that many changes and variations may be made in the above described invention without departing from the true spirit and scope thereof.

We claim:

1. In a brake assembly, a wheel, a brake shoe lever, a brake shoe mounted on the lever and adapted to engage the wheel, a pair of spaced brake shoe rods, means for moving the rods in a longitudinal direction, and an adjustable connection between the lever and rods comprising a housing member fixedly secured between the rods and having a cylindrical passage therethrough, a sleeve member slidably mounted in the passage and pivotally connected with the brake shoe lever, one of said members having a series of longitudinally spaced openings therein and the other said member having at least one corresponding opening adapted to register successively with the first openings as the sleeve member moves along the passage, and a pin adapted to be inserted in the openings when so registered to secure the members in adjusted position.

2. The assembly of claim 1 in which the housing and sleeve members each has a series of longitudinally spaced openings adapted for successive registration as the sleeve member moves along the passage.

3. The assembly of claim 1 in which the sleeve member is provided with a transversely extending portion having an opening therethrough and a pin extends through such opening and is pivotally connected with the brake shoe lever.

4. The assembly of claim 3 in which the transversely extending portion is formed integrally with the sleeve member.

5. The assembly of claim 3 in which the transversely extending portion is provided with a flange for receiving sand and directing it toward the wheel to enhance the braking action.

6. The assembly of claim 3 in which the brake shoe rods are provided with longitudinally extending slots in which the pin passing through the transversely extending portion is received.

7. The assembly of claim 3 in which the openings in the sleeve and housing members are so located as to drain off any water which may reach those members.

8. In a brake assembly, a wheel, a brake shoe lever, a brake shoe mounted on the lever and adapted to engage the wheel, a pair of spaced brake shoe rods, means for moving the rods in a longitudinal direction and an adjustable connection between the said rods and lever comprising a tubular housing fixedly mounted between the rods, a hollow sleeve slidably mounted in the housing and provided at one end with an integral transversely extending portion having an axial opening therethrough, the brake shoe rods being provided with longitudinally extending slots, a pin passing through the said transversely extending portion, said pin being mounted in the slots and providing a pivotal connection with the brake shoe lever, the sleeve and housing being each provided with a series of longitudinally spaced openings adapted for successive registration as the sleeve is moved telescopically within the housing, and a pin adapted to pass through such openings when in registration to secure the sleeve and housing together, the said transversely extending portion being provided with an inclined flange adapted to distribute sand adjacent the wheel, and means to supply sand to the flange.

References Cited
UNITED STATES PATENTS

| | | | |
|---|---|---|---|
| 935,176 | 9/1909 | Thompson | 188—197 |
| 2,104,787 | 1/1938 | Blomberg | 188—197 XR |
| 2,381,212 | 8/1945 | Farmer | 188—197 |
| 2,881,874 | 4/1959 | Polanin | 188—197 |

DUANE A. REGER, Primary Examiner

U.S. Cl. X.R.

74—522; 291—2, 3, 46